(12) United States Patent
Fujita et al.

(10) Patent No.: US 7,024,712 B2
(45) Date of Patent: Apr. 11, 2006

(54) POSTURE CORRECTING DEVICE

(75) Inventors: Minoru Fujita, Kobe (JP); Ryoko Murotani, Toyama-ken (JP)

(73) Assignee: Foot Techno, Inc., Hyogo-Ken (JP)

( * ) Notice: Subject to any disclaimer, the term of this patent is extended or adjusted under 35 U.S.C. 154(b) by 0 days.

(21) Appl. No.: 10/349,551

(22) Filed: Jan. 23, 2003

(65) Prior Publication Data
US 2003/0173816 A1 Sep. 18, 2003

(30) Foreign Application Priority Data
Jan. 24, 2002 (JP) .............................. 2002-016196

(51) Int. Cl.
*A47C 20/02* (2006.01)
*B62J 1/00* (2006.01)

(52) U.S. Cl. ............................ 5/653; 5/655.9; 297/202

(58) Field of Classification Search ........... 297/452.27, 297/202; 5/653, 655.9
See application file for complete search history.

(56) References Cited

U.S. PATENT DOCUMENTS

| | | | | |
|---|---|---|---|---|
| 322,694 | A | * | 7/1885 | Schick .......................... 335/90 |
| 3,118,153 | A | * | 1/1964 | Hood .......................... 428/218 |
| 3,503,649 | A | * | 3/1970 | Johnson ................. 297/452.26 |
| 4,190,697 | A | | 2/1980 | Ahrens .......................... 428/315 |
| 4,951,334 | A | | 8/1990 | Maier ............................. 5/431 |
| 5,026,585 | A | | 6/1991 | Funatogawa ................. 428/71 |
| 5,134,740 | A | | 8/1992 | Summer .......................... 5/652 |
| 5,165,752 | A | * | 11/1992 | Terry ............................ 297/214 |
| D345,072 | S | * | 3/1994 | Rose et al. .................. D6/601 |
| 5,402,545 | A | * | 4/1995 | Jolley ............................. 5/653 |
| 5,433,505 | A | | 7/1995 | Coyne et al. ............. 297/284.1 |
| 5,681,092 | A | * | 10/1997 | Hanson et al. ......... 297/452.41 |
| D456,516 | S | * | 4/2002 | Cheshaek et al. .......... D24/183 |
| 6,523,202 | B1 | * | 2/2003 | Loomos .......................... 5/653 |
| 6,571,411 | B1 | * | 6/2003 | Ebe ................................ 5/653 |
| 6,581,227 | B1 | * | 6/2003 | Obermaier ...................... 5/654 |
| 2002/0124318 | A1 | | 9/2002 | Loomos .......................... 5/653 |

FOREIGN PATENT DOCUMENTS

| | | |
|---|---|---|
| DE | 2712611 | 9/1978 |
| DE | 8513991 | 10/1985 |
| DE | 3810980 | 10/1989 |
| DE | 29709334 | 7/1997 |
| DE | 29710709 | 8/1997 |
| FR | 2609702 | 7/1998 |
| GB | 2356136 | 5/2001 |

* cited by examiner

*Primary Examiner*—Peter M. Cuomo
*Assistant Examiner*—Sarah B. McPartlin
(74) *Attorney, Agent, or Firm*—Mark C. Pickering

(57) ABSTRACT

A seat pad is provided with a lower pad member and a upper pad member that is attached to the lower pad member by an adhesive. A pair of projections is formed at the front portion of the seat pad. A concave is defined between the projections. The upper surface of the seat pad is inclined to be lower toward the front end of the seat pad when the seat pad is put on a seat of a chair. When a person sits on the seat pad, a pelvis is held in a proper position, which improves the flow of blood and the behavior of nerve.

20 Claims, 13 Drawing Sheets

Fig.17
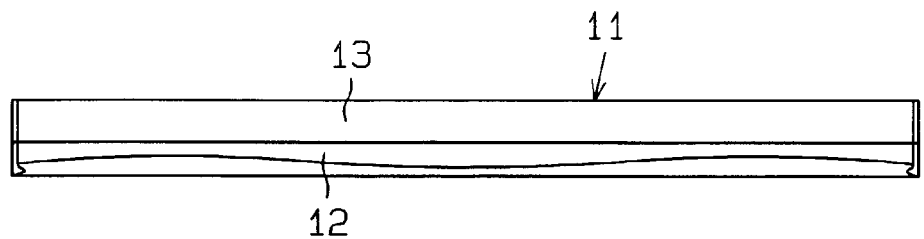
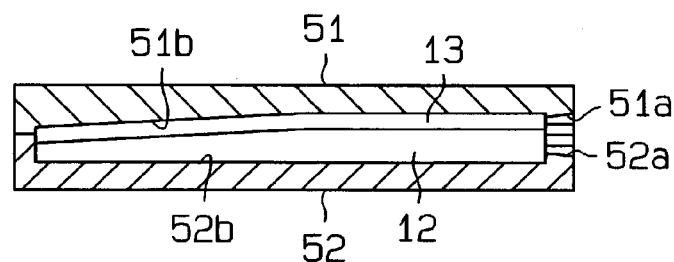
Fig.18(a)
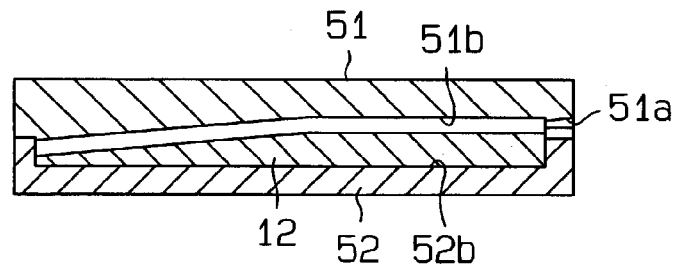
Fig.18(b)
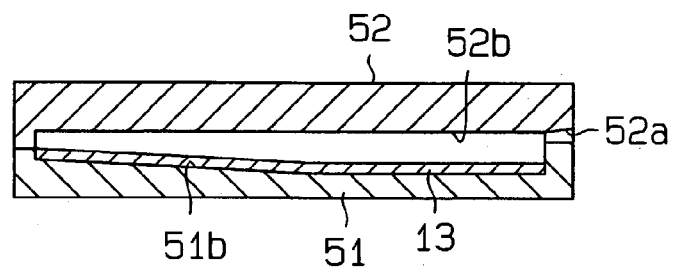
Fig.18(c)

POSTURE CORRECTING DEVICE

BACKGROUND OF THE INVENTION

The present invention relates to a posture correcting device that supports a hip of a person such that a pelvis is held in a proper position, a method for manufacturing the same, and a chair.

Generally, a seat pad arranged on a seat of a chair is used mainly to prevent a hip from chilling and improve feeling to sit on. The seat pad is formed, for example, by receiving foamed synthetic resin or cotton into a pouched cloth cover. The thickness is constant for the whole seat pad. Otherwise, a portion of the seat pad on which a hip is seated is more hollowed than other portions.

As shown in FIGS. 11(a) and 11(b), a pelvis 36 of a person includes a pair of iliac bones 37, a sacrum 39 which is located between the iliac bones 37 by way of sacroiliac 38, and an ischial bone 40 which connects lower ends of the iliac bones 37. A spine 41 includes a fifth lumbar 42 on the lowest portion. The fifth lumbar 42 is connected to the sacrum 39 by way of an articulation 43. When the hip is put on the above-mentioned seat, the sacrum 39 may not keep its proper position. Accordingly, distortion is produced between the fifth lumbar 42 and the sacrum 39, which deteriorates the flow of blood and the behavior of nerve. This causes stiff shoulders, lower back pain and chill.

SUMMARY OF THE INVENTION

The objective of the present invention is to provide a posture correcting device that supports a hip such that a pelvis is held in a proper position, a method for manufacturing the same and a chair.

To achieve the above objective, the present invention provides a posture correcting device having a support surface for supporting a part of a human body. The device includes a front end and a rear end. The support surface is inclined to be lower toward the front end from the rear end when the part of the human body is supported on the support surface.

The present invention also provides a chair having a seat. The seat is inclined to be lower toward the front side of a person who sits on the seat.

The present invention further provides a method for manufacturing a posture correcting device that takes the form of a pad. The device includes a support surface for supporting a part of a human body. The thickness of the device becomes smaller toward a front end from a rear end of the device. The method includes: a step for preparing a sheet piece, wherein the sheet piece is made of a relatively hard material, and wherein the sheet piece has a predetermined width and thickness; a step for slicing the sheet piece in the thickness direction of the sheet piece such that two pieces of lower sheets are obtained, wherein the thickness of each lower sheet changes in the width direction of the sheet piece; a step for adhering an upper sheet that is made of a relatively soft material to one of the lower sheets such that a pad forming sheet is obtained; and a step for cutting or punching the pad forming sheet into a predetermined form, thereby obtaining a plurality of the devices.

Additionally, the present invention provides a method for manufacturing a posture correcting device that takes the form of a pad. The device includes a support surface that supports a part of a human body. The thickness of the device becomes smaller toward a front end from a rear end of the device. The device includes an upper pad member having the support surface and a lower pad member attached to the upper pad member. The hardnesses of the upper pad member and the lower pad member are different from each other. The method includes a step for supplying a molten material for the upper pad member and a molten material for the lower pad member into a mold at the same time or at an intervals, thereby molding the device.

The present invention provides another method for manufacturing a posture correcting device that takes the form of a pad. The device includes a support surface that supports a part of a human body. The thickness of the device becomes smaller toward a front end from a rear end of the device. The device includes an upper pad member having the support surface and a lower pad member attached to the upper pad member. The hardnesses of the upper pad member and the lower pad member are different from each other. The method includes: a step for precedently preparing one of the upper pad member and the lower pad member; a step for accommodating the one pad member in a mold; a step for supplying a molten material for the other pad member into the mold that accommodates the one pad member, thereby molding the device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 17 is a front view showing another embodiment of the seat pad;

FIGS. 18(a), 18(b) and 18(c) are cross-sectional views showing a method for forming a seat pad by using a mold;

DETAILED DESCRIPTION OF THE PREFERRED EMBODIMENTS

An embodiment according to the present invention will now be described with reference to FIGS. 1 to 12.

Figure 1:
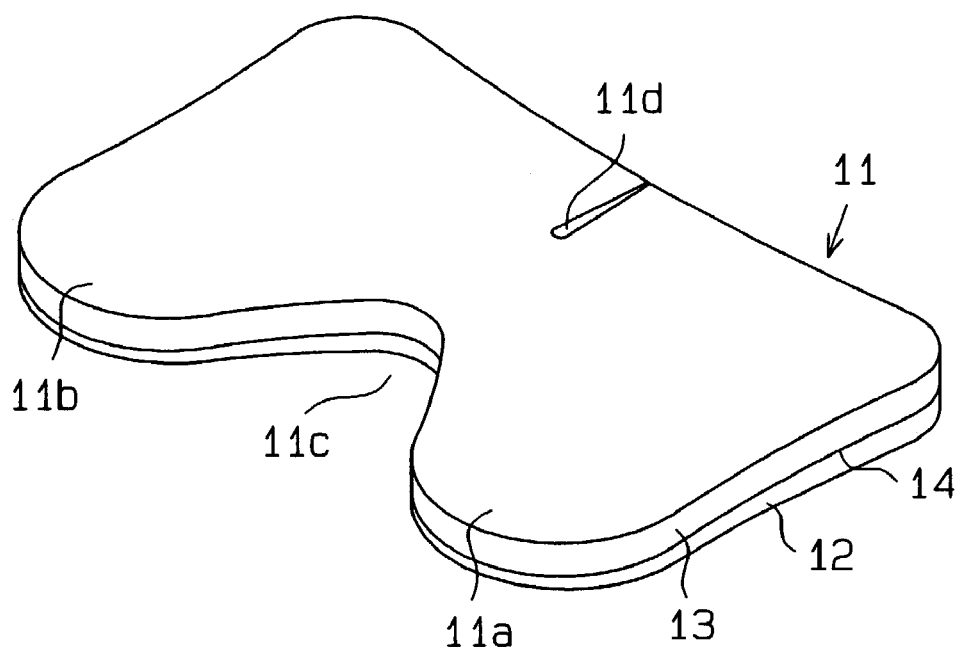
FIG. 1 is a perspective view showing an embodiment of a seat pad according to the present invention.

As shown in FIG. 1, a seat pad 11, which is a posture correcting device, includes a lower pad member 12 and an upper pad member 13, which is attached to the lower pad member 12 by an adhesive 14. A pair of projections 11a, 11b are formed at the front portion of the seat pad 11. A concave 11c is formed between the projections 11a, 11b. A slit 11d is formed on the rear portion of the seat pad 11. The slit 11d is located in the central part in the width direction of the seat pad 11. The slit 1id extends from the rear end to the front part of the seat pad 11.

Figure 2:
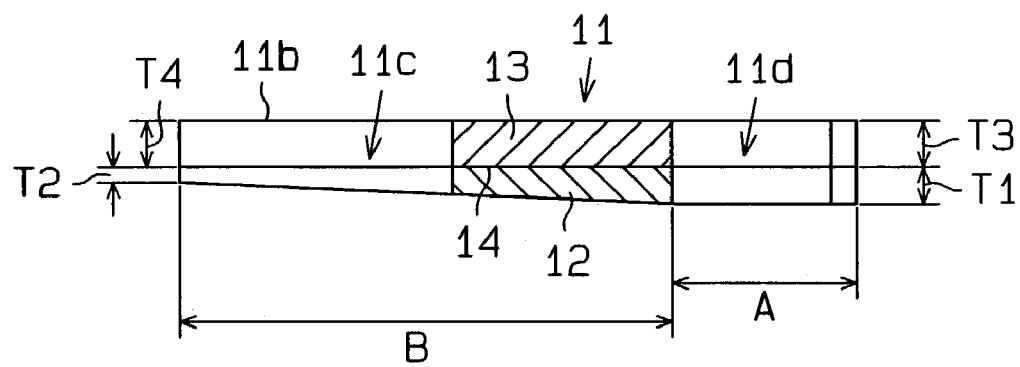
FIG. 2 is a side cross-sectional view showing the seat pad of FIG. 1.
Figure 3:
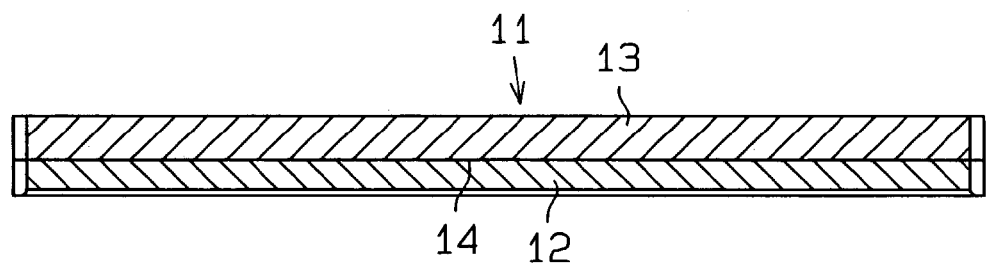
FIG. 3 is a front cross-sectional view showing the seat pad of FIG. 1.

In FIG. 2, T1 shows the thickness of the rear end of the lower pad member 12. T2 shows the thickness of the front end of the lower pad member 12. T3 shows the thickness of the rear end of the upper pad member 13. T4 shows the thickness of the front end of the upper pad member 13. The thickness T2 is smaller than the thickness T1 in the lower pad member 12. While, the thickness T4 is the same as the thickness T3 in the upper pad member 13. That is, the lower pad member 13 has a constant thickness. In the lower pad member 12, the rear region A is defined between the rear end and a part that is separated forward by a distance from the rear end. The rear region A has a constant thickness T1. In the region B, which is the region other than the rear region A in the lower pad member 12, the thickness becomes smaller as the lower pad member 12 goes forward from the thickness T1 to the thickness T2. The rear region A has the length of, for example, 0–10 cm or 5–8 cm. The front region B has the length of, for example, 10–25 cm or 12–15 cm. The seat pad 11 has the width of, for example, 15–45 or 15–200 cm.

The thickness T1 of the lower pad member 12 is set at 3–30 mm, 5–25 mm or 7–15 mm. The thickness T2 of the lower pad member 12 is set at 0–30 mm or 2–25 mm. The thicknesses T3 and T4 of the upper pad member 13 are set at 1–30 mm or 3–25 mm, respectively. The thicknesses T1 to T4 are determined in accordance with the intended use (the time span for seating, for example) of the seat pad 11. In the seat pad 11 that is suitable for use within two hours, for example, the thickness T1 of the lower pad member 12 is set at 3–30 mm or 5–25 mm, and the thickness T2 of the lower pad member 12 is set at 0–15 mm or 1–10 mm. For example, the lower pad member 12 has the thickness T1 of 12 mm and the thickness T2 of 4 mm. The thicknesses T3 and T4 of the upper pad member 13 are set at 15 mm, respectively.

In the seat pad 11 that is suitable for use more than two hours, the thicknesses T1 and T2 of the lower pad member 12 are the same as those in the seat pad 11 that is suitable for use within two hours and the thicknesses T3 and T4 of the upper pad member 13 are changed. For example, the thicknesses T3 and T4 are set at 10 mm, respectively. In the seat pad 11, which is suitable for use for many hours, the thicknesses T3 and T4 are set at 1–7 mm or 2–5 mm, respectively. The upper pad member 13, which is extremely thick, increases the speed of blood flow, which makes a person sitting on the seat pad 11 feel heavy. Therefore, the upper pad member 13 is preferably thin in the seat pad 11 that is suitable for use for many hours.

The thickness T1 of the lower pad member 12 may be set at 3–30 mm or 3–20 mm, the thickness T2 of the lower pad member 12 may be set at 0–15 mm or 1–10 mm, the thickness T3 of the upper pad member 13 may be set at 1–30 mm or 5–25 mm and the thickness T4 of the upper pad member 13 may be set at 0–30 mm or 3–25 mm. In the seat pad for children, the thicknesses T3 and T4 of the upper pad member 13 are set at 1–13 mm or 2–5 mm, respectively. The thickness T1 of the lower pad member 12 is set at 1–30 mm or 3–25 mm. The thickness T2 of the lower pad member 12 is set at 0–15 mm or 0–10 mm. The whole size of the seat pad 11 is more decreased than that for adults.

Figure 4:
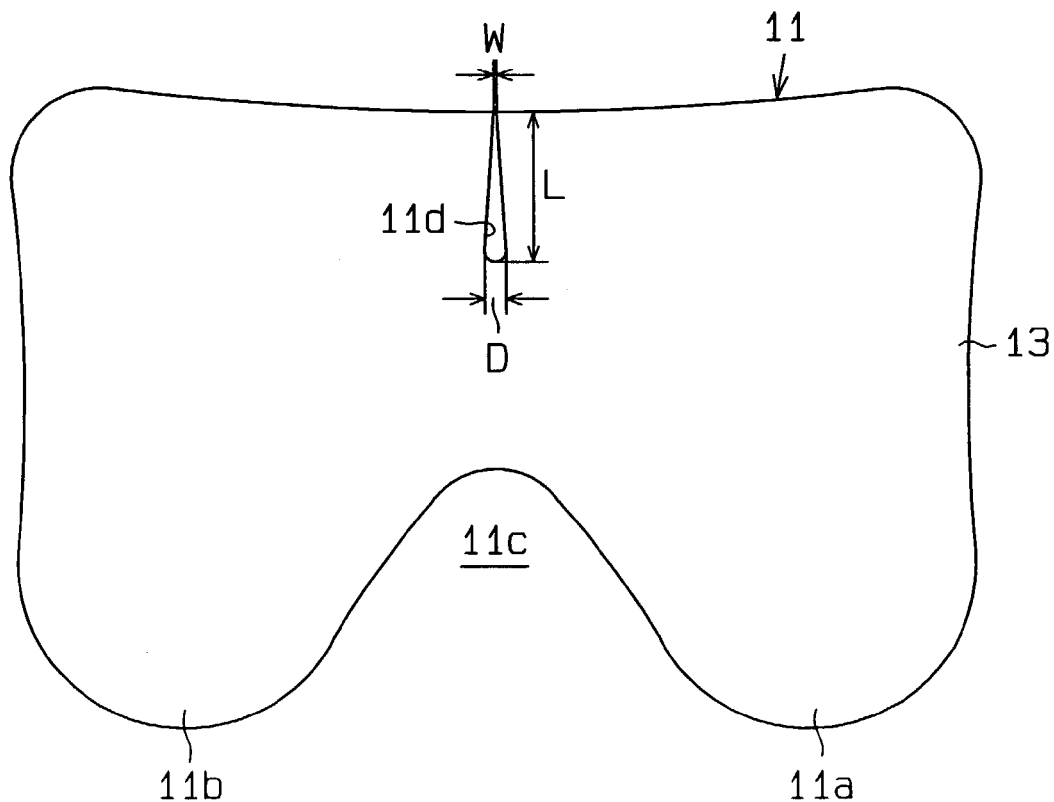
FIG. 4 is a plan view showing the seat pad of FIG. 1.

As shown in FIG. 4, the length L of the slit 11d is set at, for example, 1–10 cm and is set at 5 cm in this embodiment. The width W of the opening of the slit 11d is set at, for example, 0–7 mm or 2–5 mm and is set at 1 mm in this embodiment. Further, the width D of the inner end of the slit 11d is set at, for example, 1–20 mm or 3–15 mm and is set at 5 mm in this embodiment.

When the seat pad 11 is put on the seat of the chair, which is horizontal, the inclination angle of the upper surface (support surface) of the seat pad 11 with respect to the seat is 2–30 degrees or 5–28 degrees. The preferable inclination angle is 4–20 degrees or 5–15 degrees, more preferably 5–8 degrees. The inclination angle corresponds to the angle made by the lower surface and the upper surface of the seat pad 11.

The lower pad member 12 is made of nonwoven fabric, rubber or resin. The lower pad member 12 may be a complex of at least one type of rubber and at least one type of resin. The rubber, resin and the complex may be solid or foam. Synthetic rubber such as styrene butadiene rubber (SBR) is preferably used for the rubber. Eethylene-polyvinyl acetate copolymer resin (EVA), polyurethane resin, polyethylene resin, vinyl chloride resin or polypropylene resin may be preferably used.

The upper pad member 13 is made of rubber, resin or a complex of at least one type of rubber and at least one type of resin. The rubber, resin and complex may be solid or foamed. Synthetic rubber such as chloroprene rubber, acrylonitrile butadiene rubber (NBR), polyisoprene rubber, or polybutadiene rubber, natural rubber, and natural rubber latex are preferably used for the rubber. Polyurethane resin, fluoroplastic, and silicone resin are preferably used for the resin.

The hardness of the lower pad member 12 is set within a range of 15 degrees to 85 degrees and, for example, 50 degrees. The hardness of the upper pad member 13 is set within a range of 2 degrees to 30 degrees and, for example, 11 degrees. The hardnesses of the pad members were measured with Japanese Industrial Standard: JIS-K6253:

type E durometer and Japanese Rubber Association referential standard: type C durometer (spring hardness testing machine). The pad members were measured at Chemicals Evaluation and Research Institute, Osaka Office with the two kinds of durometers, respectively. The results obtained from the durometers are substantially the same.

The materials and the hardnesses of the lower and upper pad members 12, 13 are determined taking the followings into consideration. That is, the material and the hardness of the lower pad member 12 are determined such that the lower pad member 12 is slightly concaved when the hip is put thereon. The preferable hardness of the lower pad member 12 is 35–75 degrees and more preferably 50–62 degrees. On the other hand, a soft foamed material having a constant thickness is preferably used for the upper pad member 13. Specifically, the foamed material is glutinous and limp. The upper pad member 13 that is fluffy and excessively soft like a general cushion is not preferable because the hip is caught therein. The preferable hardness of the upper pad member 13 is 5–20 degrees and more preferably 10–13 degrees.

A method for manufacturing the seat pad 11 will now be described with reference to FIGS. 5 to 8.

Figure 5:
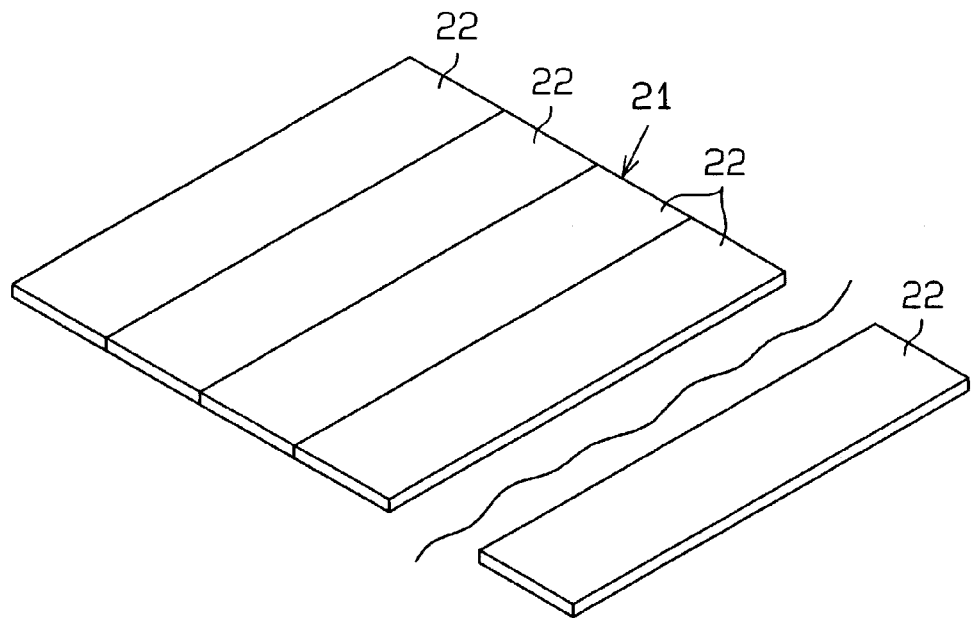
FIG. 5 is a perspective view showing a step for manufacturing a sheet piece from a hard plastic sheet.

First, as shown in FIG. 5, a hard resin sheet (hard material) 21 is cut into a plurality of sheet pieces 22. The hard resin sheet 21 is made of foam of EVA resin (ethylene-polyvinyl acetate copolymer) or foam of polyurethane resin.

Figure 6:
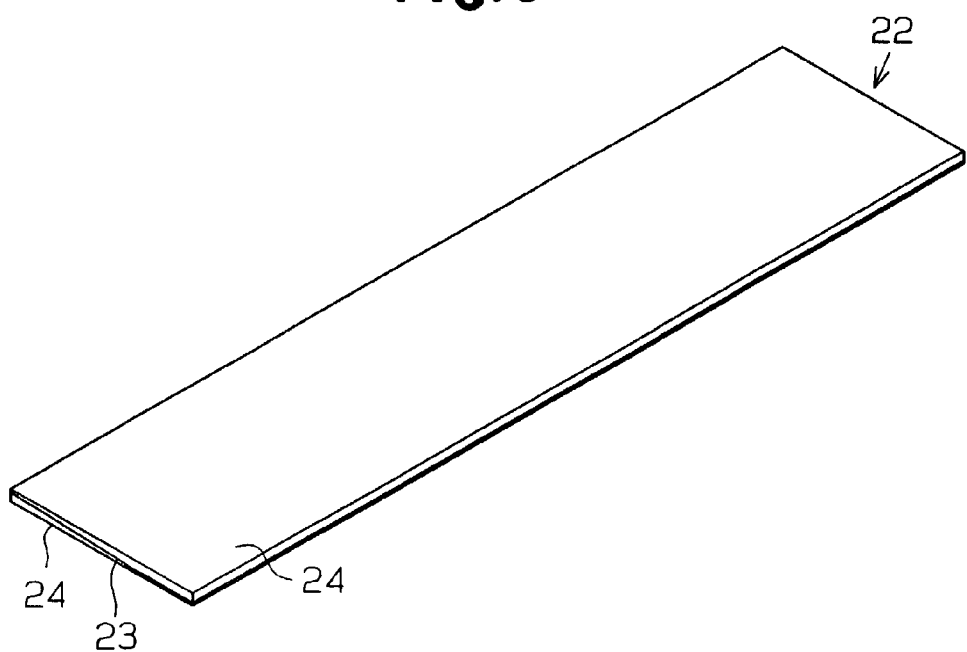
FIG. 6 is a perspective view showing a step for manufacturing a lower sheet, which is used for a lower pad member, from a sheet piece.

Next, as shown in FIG. 6, each sheet piece 22 is sliced along a prearranged slice line 23, thereby forming two lower sheets 24 having the same form. A plurality of lower pad members 12 is formed from each lower sheet 24. The thickness of the lower sheet 24 changes in the width direction of the sheet piece 22 in accordance with the thickness of the lower pad member 12.

Figure 7:
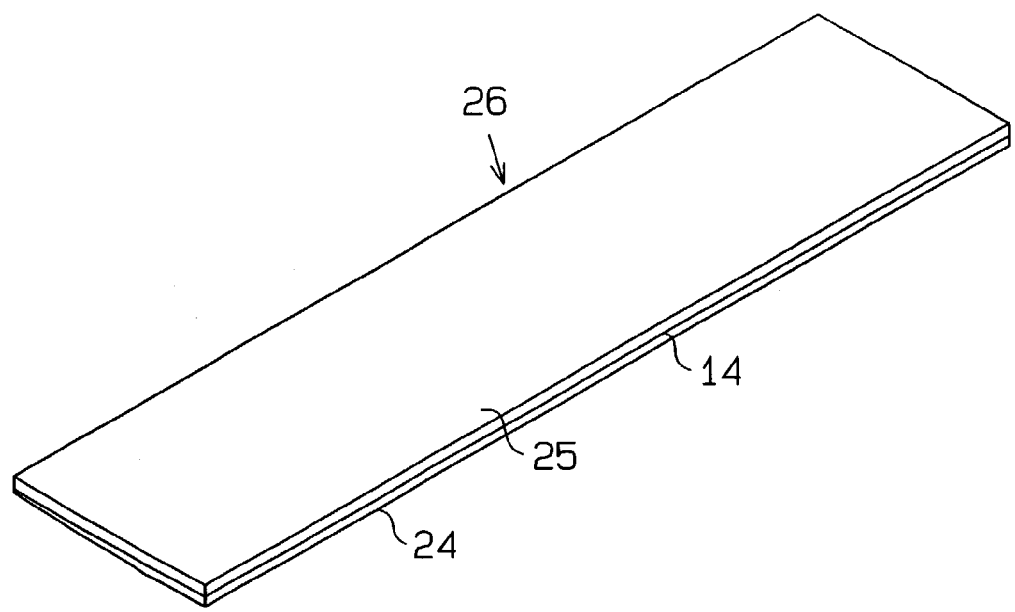
FIG. 7 is a perspective view showing a step for manufacturing a pad forming sheet.

Next, as shown in FIG. 7, an upper sheet (soft material) 25, which is made of foam of chloroprene rubber or foam of polyurethane resin, is prepared. A plurality of upper pad members 13 is formed from the upper sheet 25. The upper sheet 25 is attached to the upper surface of the lower sheet 24, which is obtained in the step of FIG. 6, by the adhesive 14, thereby forming a pad forming sheet 26.

Figure 8:
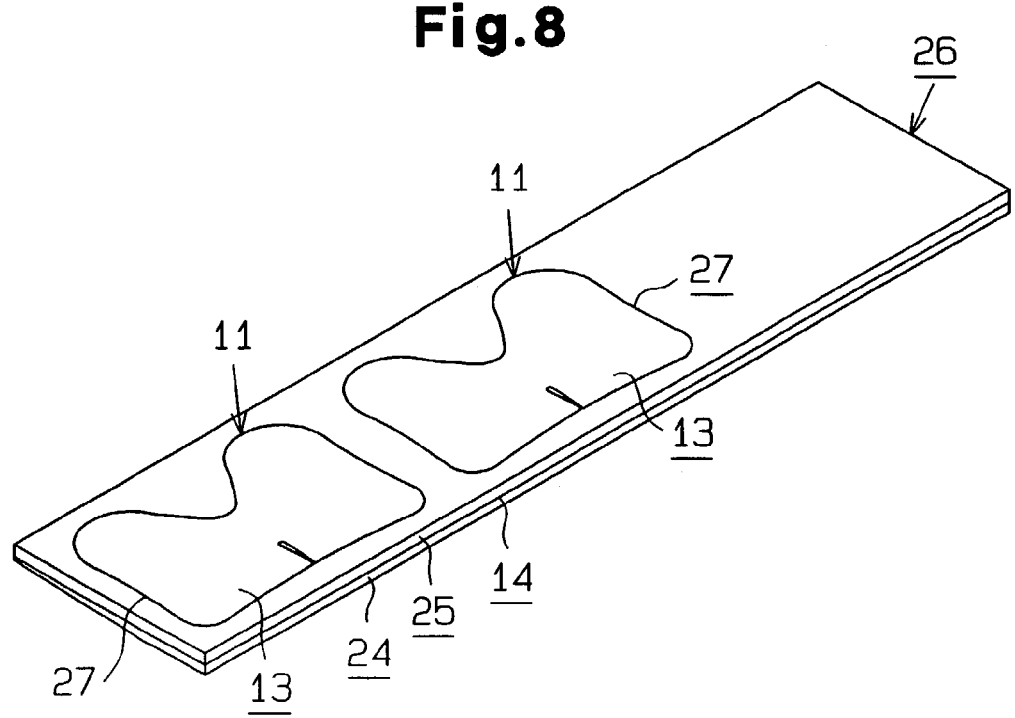
FIG. 8 is a perspective view showing a step for manufacturing a pad from the pad forming sheet.

Next, the pad forming sheet 26, which is obtained in the step of FIG. 7, is cut along a prearranged cutting line 27 into a predetermined form or punched by press as shown in FIG. 8, thereby forming the seat pad 11.

The seat pad 11, which is manufactured in accordance with the above description, is covered with a cloth. Synthetic fiber such as polyester and nylon or natural fiber, which is elastically knitted, is preferable for the material of the cloth. Polyurethane thread may be used for the material of the cover. The cover may be blended fabric or knit. Further, the material of the cover may be leatherette or artificial leather. Other elastic materials are used for the cover. Minus ion processing or far-infrared radiation processing are preferably applied to the cover.

Figure 9:
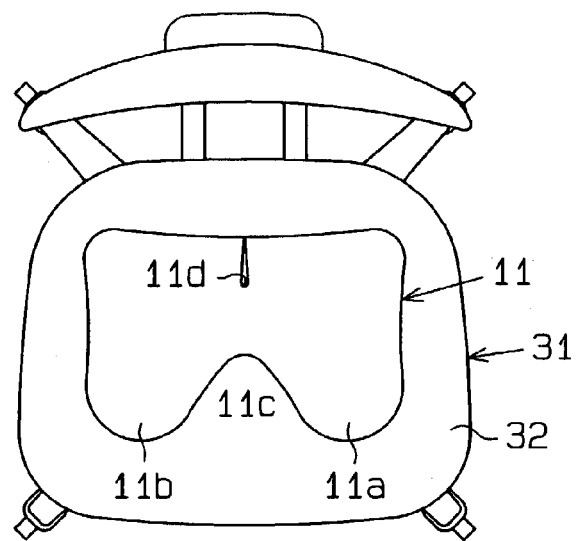
FIG. 9 is a plan view showing a state in which the seat pad is arranged on a chair.
Figure 10:
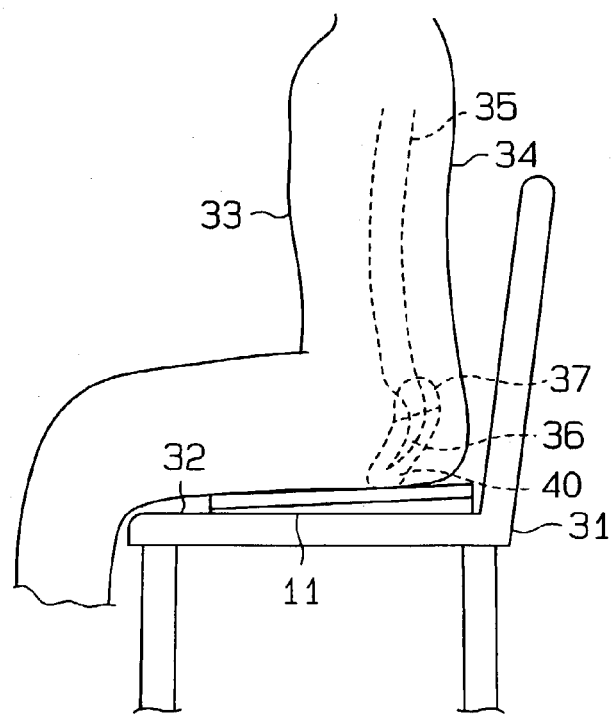
FIG. 10 is a side view showing a state in which the seat pad is applied.
Figure 11:
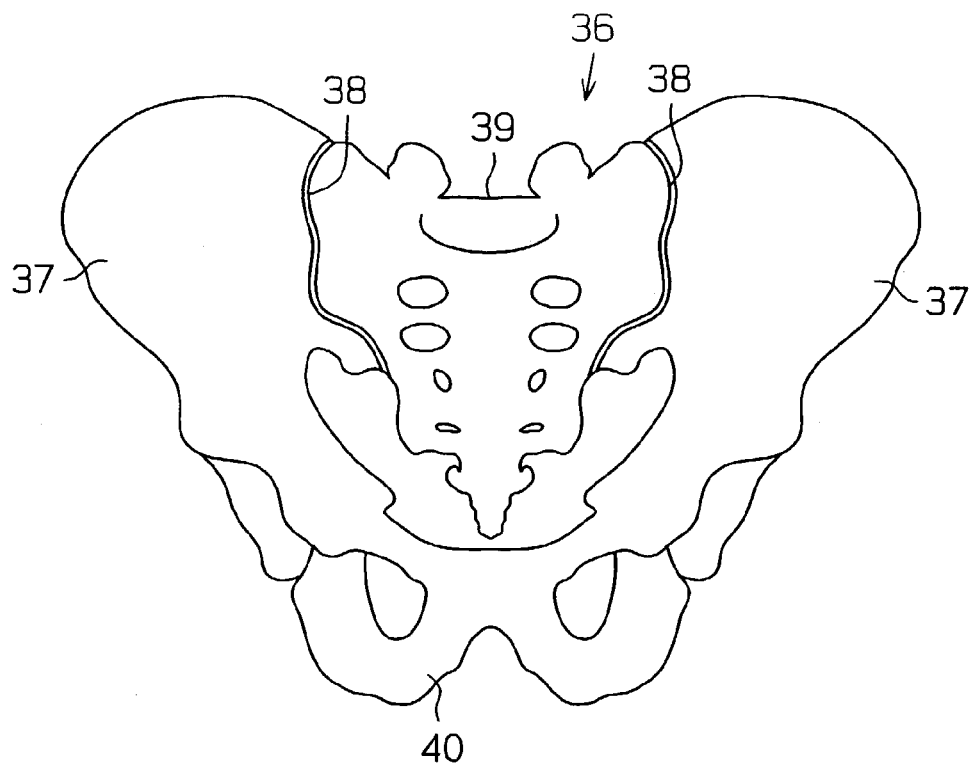
FIG. 11(a) is a plan view showing a pelvis.
FIG. 11(b) is a side view showing a spine and a sacrum.
Figure 11:
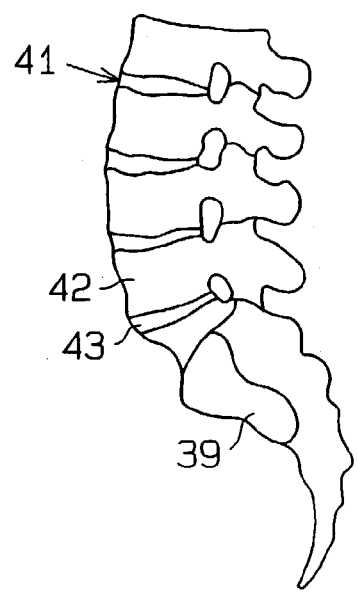

FIG. 9 shows the state in which the seat pad 11 is arranged on the seat 32 of the chair 31. The projections 11a, 11b of the seat pad 11 show forward (downward in FIG. 9). A person sits on the seat pad 11 of this state, which is shown in FIG. 10. The upper surface of the seat pad 11 is easily inclined to be lower as it goes forward (left in FIG. 10). Accordingly, a human body 33 is inclined forward and the pelvis 36 is naturally corrected to be inclined forward. This cures stiff shoulder, lower back pain and chill and promises hip up effect. The reasons will be described as follows.

As shown in FIGS. 11(a) and 11(b), a pelvis 36 of a person includes a pair of iliac bones 37, a sacrum 39 which is located between the iliac bones 37 by way of sacroiliac 38, and ischial bone 40 which connects lower ends of the iliac bones 37. A spine 41 includes a fifth lumbar 42 on the lowest portion. The fifth lumbar 42 is connected to the sacrum 39 by way of an articulation 43. When a person sits on the seat pad 11, as shown in FIG. 10, the seat pad 11 slightly inclines the ischial bone 40 forward. This moves the sacroiliac 38, which is located between the sacrum 39 and the iliac bones 37. The posture of the sacrum 39 is held inclining forward, which is the proper position of the sacrum 39. Accordingly, the posture of the spine 41 is corrected, which improves the flow of blood and the behavior of nerve. Specifically, the use of the seat pad 11 makes it easy to keep a good posture, promotes the flow of blood and activates functions of the human body. Further, the seat pad 11 cures lower back pain.

Figure 12:
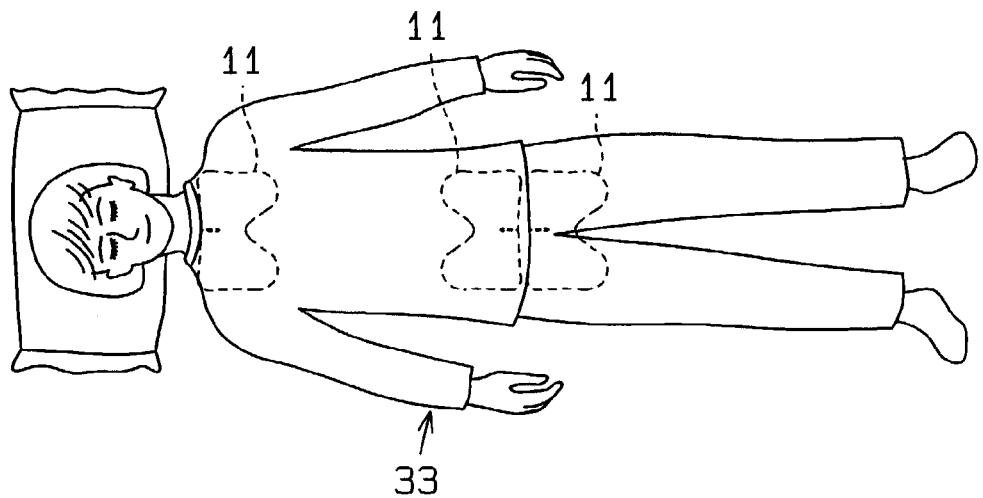
FIG. 12 is a plan view showing a state in which the seat pad is applied.

The seat pad 11 of this embodiment may be used as follows. As shown in FIG. 12, in the state that the human body 33 lies back, a plurality of seat pads 11 may be overlaid beneath, for example, the upper portion of the back and the lower back. Otherwise, one or a plurality of seat pads 11 may be put between a backrest of a relax chair and the back. Further, the seat pad 11 may be overlaid beneath the hip in the state that a person sits down Japanese style (folding his/her legs under him/herself), cross-legged, with stretched legs or with his legs folded sideways.

The seat pad 11 of this embodiment has the following advantages.

(1) In the state that the seat pad 11 is arranged on the seat 32 of the chair 31, the upper surface of the seat pad 11 is inclined to be lower as it goes forward. When a person sits on the seat pad 11, the pelvis 36 is held in the proper position. This improves the flow of blood and the behavior of nerve.

(2) The seat pad 11 is provided with the lower pad member 12 and the upper seat member 13 that is attached to the lower pad member 12 by the adhesive 14. The hardness of the upper pad member 13 is smaller than the hardness of the lower pad member 12. The upper pad member 13, which is relatively soft, guarantees comfortable feeling to sit on and enables a person to sit on the seat pad 11 for many hours. The upper pad member 13 also stably holds the hip such that the hip does not drop from the inclined seat pad 11. The lower pad member 12, which is appropriately hard, and the upper pad member 13, which is appropriately soft, allow the ischial bone 40 to move easily on the seat pad 11. This improves the flow of blood.

(3) The seat pad 11 is provided with a pair of the projections 11a, 11b. The concave 11c is formed between the projections 11a, 11b. As shown in FIG. 10, in the state that a person sits on the chair 31, right and left thighs are supported by the corresponding projections 11a, 11b. The projections 11a, 11b move in accordance with the horizontal move of the corresponding thighs. This improves feeling to sit on. Further, as shown in FIG. 12, in the state that the human body 33 lies back, the projections 11a, 11b of the seat pad 11 move in accordance with the move of the back of the human body 33. This improves feeling to lie down on.

(4) The slit 11d of the seat pad 11 permits the seat pad 11 to flexibly deform in accordance with the move of the hip. This improves feeling to sit on.

(5) The hardness of the lower pad member 12 is set at 15–90 degrees or 20–85 degrees. The hardness of the upper pad member 13 is set at 2–25 degrees. Therefore, in the use of the seat pad 11, the appropriate cushion properties are maintained and the comfortable feel of use is obtained.

(6) The thickness of the lower pad member 12 becomes smaller as the seat pad member 12 goes toward the front end from the rear end and the thickness of the upper pad member 13 is constant. The upper pad member 13, which is relatively soft, softly supports the hip. Therefore, a person comfortably sits on the seat pad 11 feeling inconsiderably that the lower pad member 12 is inclined.

The upper pad member 13 may be provided with an inclined surface in accordance with the intended place or use. In this case, the inclination angle of the upper surface of the seat pad 11 is set at 2–30 degrees or 5–28 degrees with respect to a horizontal level. The preferable inclination angle is 4–20 degrees or 5–15 degrees, more preferably 5–8 degrees.

(7) When the seat pad 11 is manufactured, the sheet 21, which is made of a relatively hard material, is machined, which obtains the lower sheet 24. The lower sheet 24 is attached to the upper sheet 25, which is made of a relatively soft material, to obtain the pad forming sheet 26. The pad forming sheet 26 is cut or pressed along the prearranged cutting line 27, which obtains the seat pad 11. Therefore, the seat pad 11 having bilayer structure is easily manufactured, thereby reducing the manufacturing cost.

This embodiment may be modified as follows.

Figure 13:
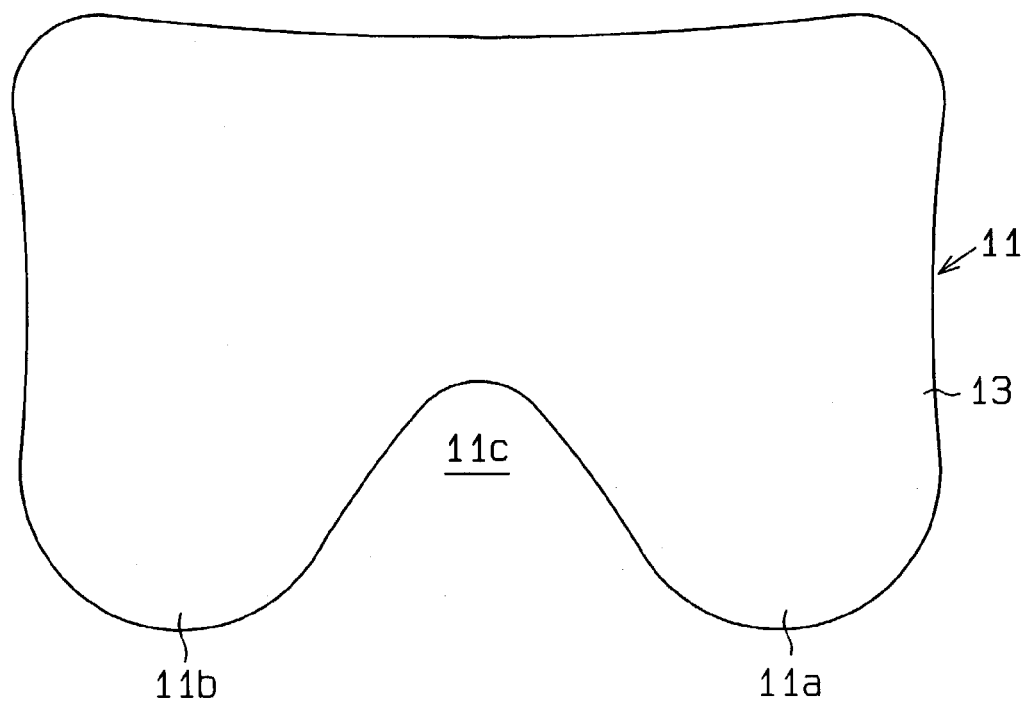
FIG. 13 is a plan view showing another embodiment of the seat pad.

As shown in FIG. 13, the slit 11d of the seat pad 11 may be omitted.

Figure 14:
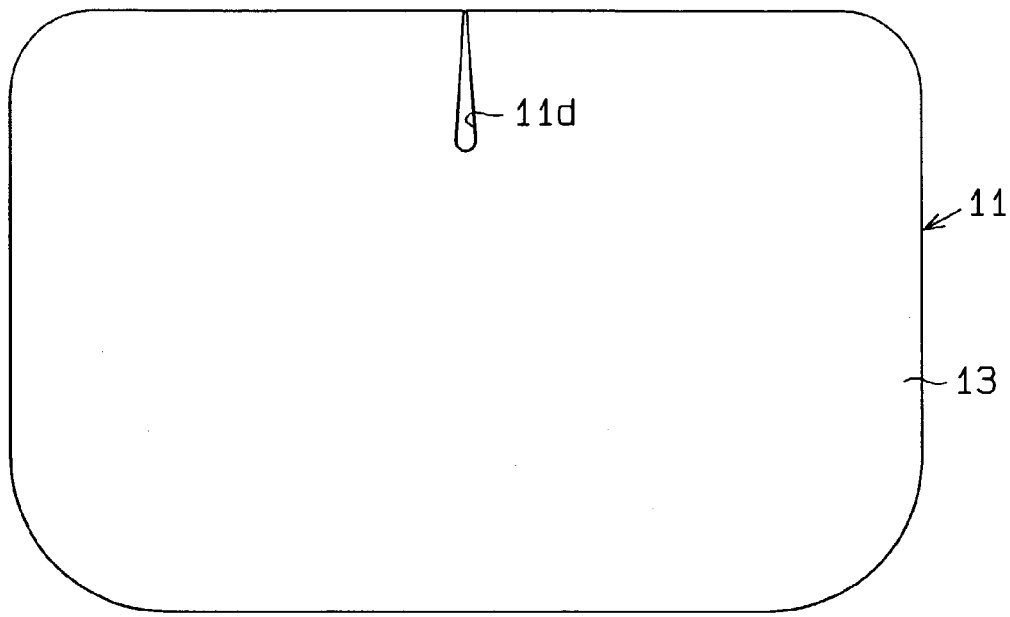
FIG. 14 is a plan view showing another embodiment of the seat pad.

As shown in FIG. 14, the projections 11a, 11b and the concave 11c of the seat pad 11 may be omitted.

Figure 15:
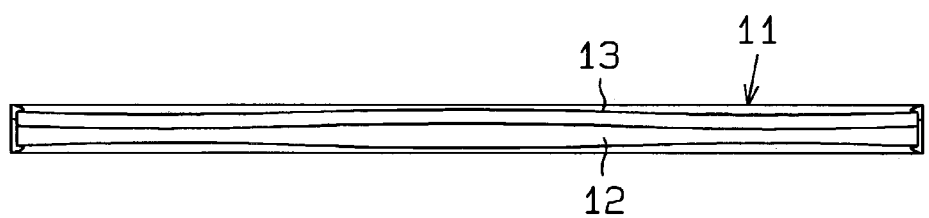
FIG. 15 is a front view showing another embodiment of the seat pad.
Figure 16:
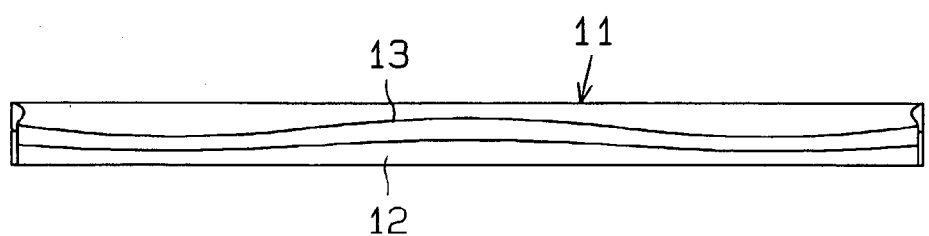
FIG. 16 is a front view showing another embodiment of the seat pad.

FIGS. 15, 16 and 17 are front views showing other embodiments of the seat pad 11, respectively. The thickness of the seat pad 11 is changed in the width direction such that the upper surface of the seat pad 11 easily deforms in accordance with the shape of the hip when the person sits on the seat pad 11. This improves feeling to sit on.

As shown in FIG. 18(a), a molding cavity is formed between a first mold 51 having a first cavity 51b and a second mold 52 having a second cavity 52b. Molten rubber or molten resin is poured into the cavities 51b, 52b through inlets 51a, 52a, respectively, thereby molding the lower pad material 12 and the upper pad member 13, which have different hardnesses from each other, at once. The molten material for the upper pad member 13 is poured through the first inlet 51a, and the molten material for the lower pad member 12 is poured through the second inlet 52a. The molten materials may be poured through the inlets 51a, 52a at regular intervals.

As shown in FIG. 18(b), the lower pad member 12, which is precedently formed, may be accommodated in the second cavity 52b of the second mold 52 and the molten material for the upper pad member 13 may be poured into the first cavity 51b of the first mold 51. To the contrary, as shown in FIG. 18(c), the upper pad member 13 may be accommodated in the first cavity 51b of the first mold 51 and the molten material for the lower pad member 12 may be poured into the second cavity 52b of the second mold 52.

In each embodiment shown in FIGS. 18(a) to 18(c), the molten materials are poured into the molds, respectively, such that the pad members 12, 13 are attached to each other.

Figure 19:
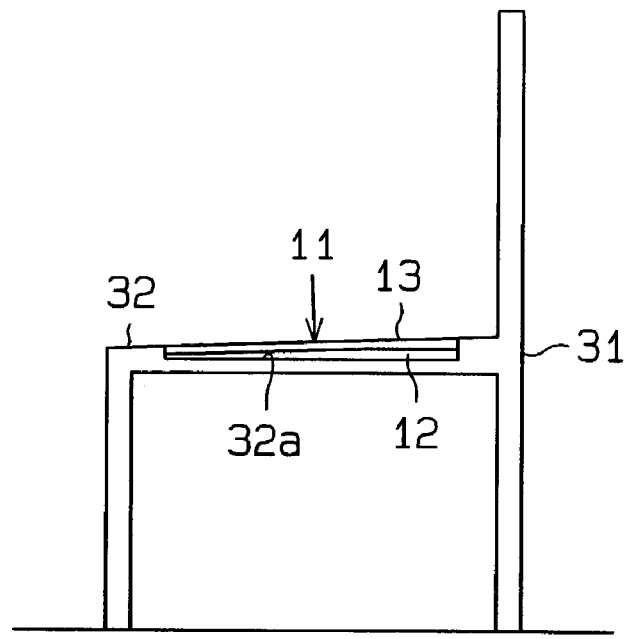
FIG. 19 is a side view showing a chair to which the seat pad is applied.

As shown in FIG. 19, an accommodating concave 32a may be formed on the seat 32 of the chair 31 and the seat pad 11 may be fit in the concave 32a. The seat pad 11 may be adhered to the seat 32, which is flat without forming the concave 32a, by an adhesive.

Figure 20:
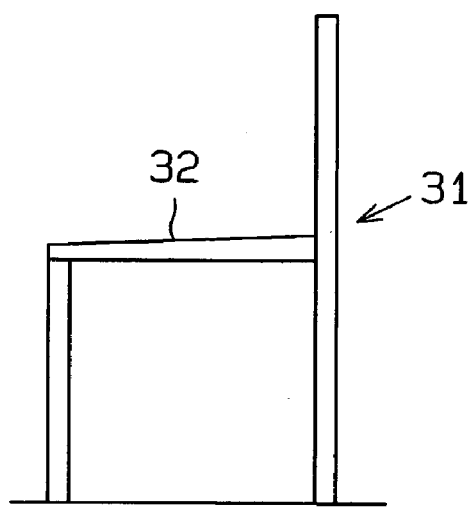
FIG. 20 is a side view showing a chair that includes a posture correcting function.

As shown in FIG. 20, the seat 32 of the chair 31 may be inclined to be lower as it goes forward. The inclination angle of the seat (support surface) 32 with respect to a horizontal level is 2–30 degrees. The preferable inclination angle is 5–15 degrees, and more preferably 5–8 degrees. In this case, the chair 31 functions as the posture correcting device.

Figure 21:
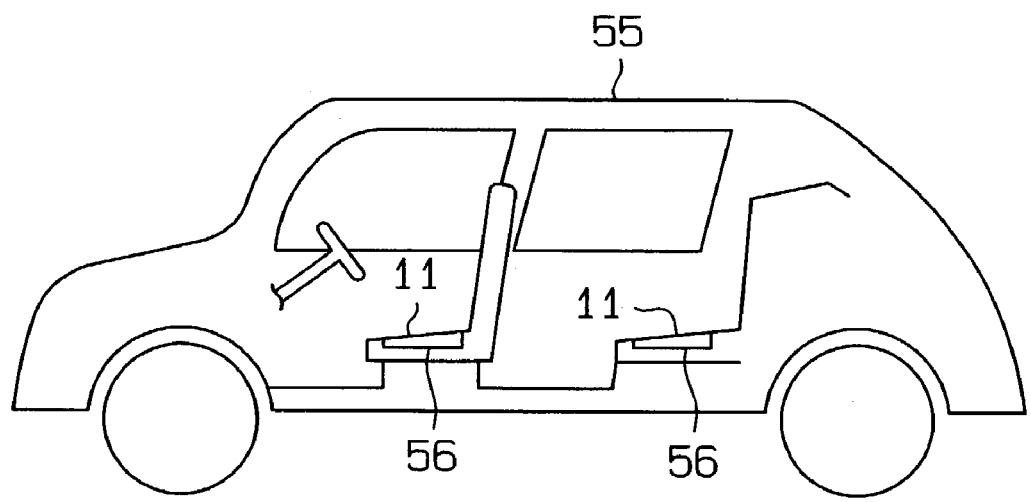
FIG. 21 is a schematic side view showing an automobile having a seat to which a seat pad is applied.

As shown in FIG. 21, the seat pad 11 may be arranged on a seat 56 of an automobile 55. The upper surface of the seat 56 may be inclined to be lower as it goes forward. The inclination angle with respect to a horizontal level is set at 2–30 degrees or 5–28 degrees.

Figure 22:
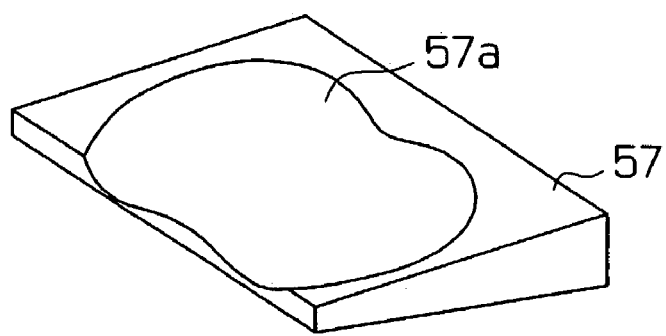
FIG. 22 is a perspective view showing another embodiment of the seat pad.

As shown in FIG. 22, a concave 57a may be formed on an upper surface of a posture correcting device 57 such that it corresponds to the shape of the hip, thereby stably supporting the hip.

Figure 23:
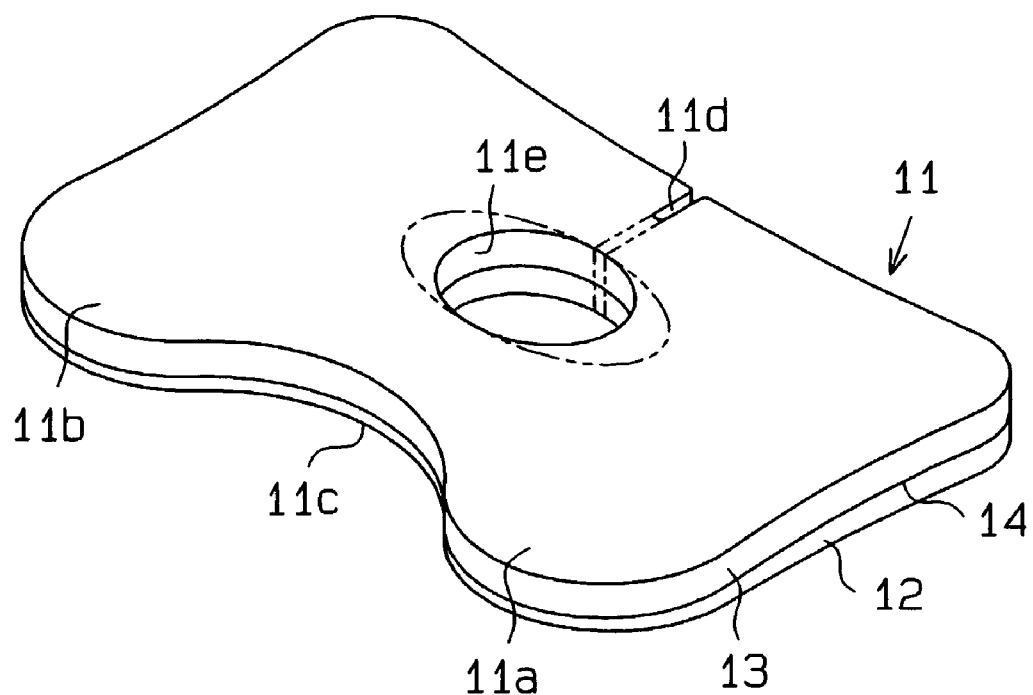
FIG. 23 is a perspective view showing another embodiment of the seat pad.

As shown in FIG. 23, an aperture 11e may be formed in the center of the seat pad 11. The shape of the aperture 11e may be round, which is illustrated in a solid line, or oval, which is illustrated in a chain double-dashed line. The inner diameter of the aperture 11e is set at, for example, 2–10 cm in the cross direction of the seat pad 11 and 3–13 cm in the width direction of the seat pad 11. A concave may be formed without forming the aperture 11e that penetrates the seat pad 11. The aperture 11e and the concave prevent an anus of a person who sits on the seat pad 11 from directly touching the seat pad 11. Therefore the seat pad 11 is preferable for a person who has hemorrhoid.

In FIG. 23, the slit 11d of the seat pad 11 may be connected to or disconnected from the aperture 11e.

Figure 24:
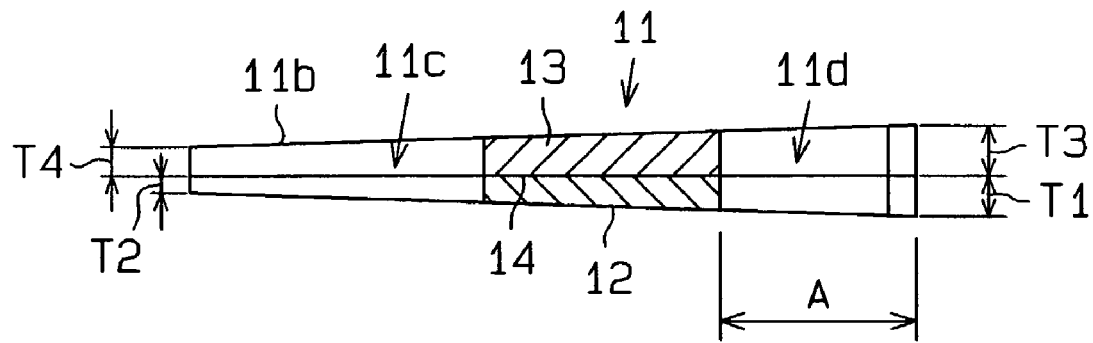
FIG. 24 is a perspective view showing another embodiment of the seat pad.

As shown in FIG. 24, the thickness of the lower pad member 12 may become smaller as the lower pad member 12 goes toward the front end from the rear end of the lower pad member 12. The thickness of the upper pad member 13 may also become smaller decreased as the upper pad member 13 goes toward to the front end from the rear end of the upper pad member 13. Further, in the seat pad 11 shown in FIG. 24, the thickness of the rear region A may be constant as the seat pad 11 shown in FIG. 2.

The seat pad 11 may have three layers, which is not illustrated. That is, an intermediate pad member may be positioned between the lower pad member 12 and the upper pad member 13. The three pad members may be adhered or attached by melting. In this case, the hardness of the intermediate pad member may be larger than that of the upper mad member 13 and smaller than that of the lower pad member 12. Otherwise, the hardness of the intermediate pad member may be larger than those of the lower and upper pad members 12, 13 and the hardness of the lower pad member 12 may be the same as or larger than that of the upper pad member 13. The seat pad 11 easily follows the move of the hip. This reduces tiredness of a middle-aged person or a old person, who use the seat pad 11. In this embodiment, the inclination angle of the upper surface of the seat pad 11 is the same as that of the seat pad 11 shown in FIG. 1.

In the seat pad 11 having three layers, the hardness of the upper pad member 13 is set at 2–30 degrees, preferably 5–20 degrees or 7–15 degrees, and more preferably 10–13 degrees. The hardness of the intermediate pad member is set at 10–85 degrees, and preferably 10–13 degrees, 40–70 degrees, 45–60 degrees, 50–60 degrees or 55–58 degrees. When the hardness of the lower pad member 12 is larger than that of the intermediate pad member, the hardness of the lower pad member 12 is 15–90 degrees or 20–85 degrees, preferably 55–85 degrees or 50–80 degrees, and more preferably 60–70 degrees. To the contrary, when the hardness of the lower pad member 12 smaller than that of the intermediate pad member, the hardness of the lower pad member 12 is 3–45 degrees or 5–40 degrees, preferably 7–35 degrees or 10–30 degrees, and more preferably 13–25 degrees or 15–20 degrees. The seat pad 11 having three layers is suitable for the case in which the high cushion properties are required. The respective hardnesses of the three pad members are properly set such that the seat pad 11, which is suitable for a person with a stoop or a lower back pain and a person using a wheelchair as well as a normal person, is provided.

The seat pad 11 may have one layer, which is not illustrated. Specifically, the seat pad 11 may be made of one kind of material.

The thickness of the seat pad 11 may be discretely reduced as the seat pad 11 goes forward.

The thickness of the lower pad member 12 may be discretely changed and the thickness of the upper pad member 13 may be constant.

The thickness of the upper pad member 13 may be changed continuously or discretely. In this case, the thickness of the lower pad member 12 may be constant or changed.

The hardness of the lower pad member 12 may be smaller than that of the upper pad member 13, which is opposite to the seat pad 11 shown in FIG. 1.

Molten material may be poured into a cavity of a mold such that the lower pad member 12 or the upper pad member 13 is formed.

When the pad members 12, 13 are formed with different materials, rough surfacing is applied to or primer is coated on at least one of the opposing surfaces of the pad members 12, 13 such that acceptable attachment between the pad members 12, 13 are achieved.

In the seat pad having a composite structure, a material or a foaming rate of one layer may be different from that of another layer such that the hardnesses of layers are different from each other. This is applied to the seat pad manufactured in accordance with the process of the embodiment illustrated in FIGS. 1 to 12 or FIGS. 18(a) to 18(c), or the seat pad is formed with the mold.

A mark such as a character or a sign, which indicates the front side or the rear side of the seat pad 11, may be attached to a proper position of the seat pad 11 such that the front side and the rear side are distinguished from each other.

In the seat pad having a composite structure, the adjacent layers may be seamed or connected by engaging the concavity and the convexity of the layers.

Figure 25:
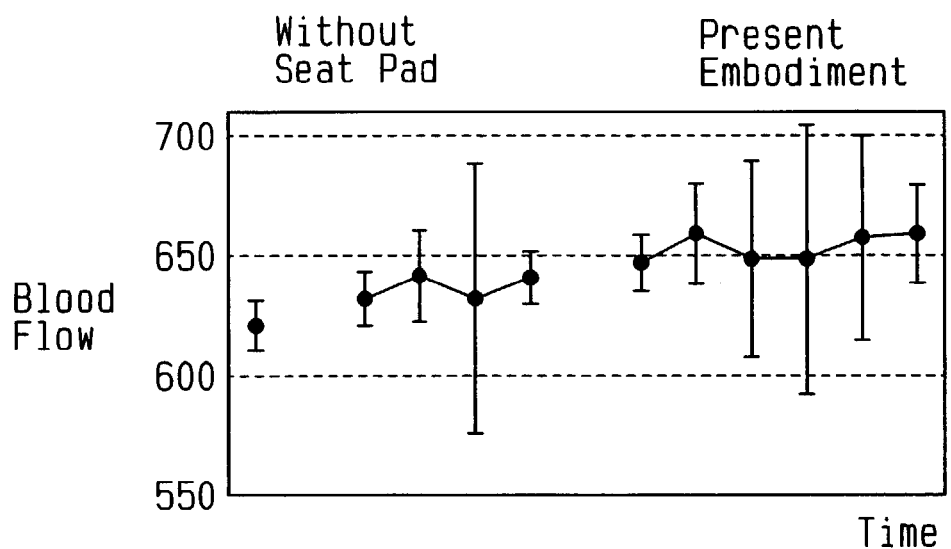
FIG. 25 is a graph showing the relationship between time and blood flow volume.
Figure 26:
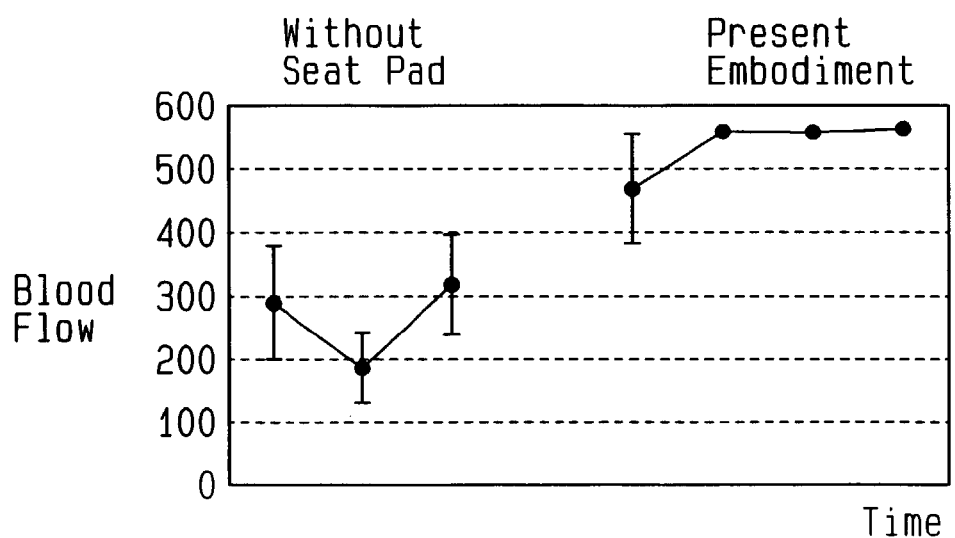
FIG. 26 is a graph showing the relationship between time and blood flow volume.

The following experiment was performed for checking the effects of the seat 11. FIGS. 25 and 26 are the graphs showing the experimental results. The detail of the seat pad 11 used in the experiment will be described. The thickness T1 of the lower pad member 12 is 12 mm, the thickness T2 of the lower pad member 12 is 4 mm and the thickness T3 and the thickness T4 of the upper pad member 13 were 15 mm, respectively. The inclination angle of the support surface of the seat pad 11 was 15 degrees. The lower pad member 12 was made of EVA resin and had the hardness of 50 degrees. The upper pad member 13 was made of chloroprene rubber and had the hardness of 18 degrees.

The amount of flow of the blood was measured by a plurality of subjects in the case that the subjects sit on the chair by way of the seat pad 11 and in the case that the subjects sit on the chair without the seat pad 11. The laser doppler flow-meter was used to measure the blood flow volume. The blood volume at the tip of the ring finger of the left hand was measured.

Data were obtained and analyzed using the system of "MP100A" produced by BIOPAC Systems, Inc. The system includes a data analyzing software of "AcqKnowledge (version 3.7.0)", which is also produced by BIOPAC Systems, Inc. Further, the software of Excel 2000 produced by Microsoft Corporation was used. The data relating to the blood flow volume were collected at a speed of 200 samples per second and smoothing was applied to the data. The data were spaced every one minute and the average ± standard deviation was calculated.

The graphs in FIGS. 25 and 26 illustrate the fluctuation of the blood flow volume with time in the state that the seat pad 11 was used and the states that the seat pad 11 was not used. The data shown in the graphs of FIGS. 25 and 26 were obtained from different subjects. These graphs show that the blood flow volume was more increased when the seat pad 11 was used than when the seat pad 11 was not used.

The present examples and embodiments are to be considered as illustrative and not restrictive and the invention is not to be limited to the details given herein, but may be modified within the scope and equivalence of the appended claims.

The invention claimed is:

1. A posture correcting device comprising:
an upper pad member having a substantially uniform thickness, a front end, a rear end, a top surface, and a bottom surface, the top surface and the bottom surface being planar from the front end to the rear end; and
a lower pad member having a plurality of sections, the plurality of sections including:
a first section having a substantially uniform thickness, a front end, a rear end, a top surface, and a bottom surface, the top surface of the first section contacting the bottom surface of the upper pad member so that the rear end of the first section lies adjacent to the rear end of the upper pad member; and
a second section having a non-uniform thickness, a front end, a rear end, a top surface, and a bottom surface, the top surface of the second section contacting the bottom surface of the upper pad member so that the rear end of the second section contacts the front end of the first section, wherein the bottom surface of the second section is angled with respect to the bottom surface of the first section so that a thickness of the rear end of the second section is greater than a thickness of the front end of the second section,
wherein the upper pad member includes a pair of projections that extend away from the front end of the upper pad member, and wherein a concave region is defined between the projections.

2. The device according to claim 1, wherein a hardness of the upper pad member and a hardness of the lower pad member are different from each other.

3. The device according to claim 2, wherein the hardness of the lower pad member is greater than the hardness of the upper pad member.

4. The device according to claim 2, wherein the hardness of the lower pad member is 15–85 degrees and the hardness of the upper pad member is 2–30 degrees.

5. The device according to claim 2, wherein the lower pad member is made of a material that is selected from nonwoven fabric, rubber, resin and a complex of rubber and resin.

6. The device according to claim 5, wherein the rubber used for the material of the lower pad member is selected from a plurality of synthetic rubbers including styrene, butadiene rubber, and wherein the resin used for the material of the lower pad member is selected from ethylene-polyvinyl acetate copolymer, polyurethane resin, polyethylene resin, vinyl chloride resin, and polypropylene resin.

7. The device according to claim 5, wherein the lower pad member is foam.

8. The device according to claim 2, wherein the upper pad member is made of a material selected from rubber, resin, and a complex of rubber and resin.

9. The device according to claim 8, wherein the rubber used for the material of the upper pad member is selected from synthetic rubber, natural rubber and natural rubber latex, wherein the synthetic rubber is selected from chloroprene rubber, acrylonitrile butadiene rubber, polyisoprene rubber, and polybutadiene rubber, and wherein ther resin used for the material of the upper pad member is selected from polyurethane resin, fluoroplastic, and silicone resin.

10. The device according to claim 8, wherein the upper pad member is foam.

11. The device according to claim 2, wherein the rear end of the first section of the lower pad member has the thickness of 3–30 mm and the front end of the second section of the lower pad member has the thickness of 0–15 mm, and wherein the rear end of the upper pad member has a thickness of 1–30 mm and the front end of the upper pad member has a thickness of 0–30 mm.

12. The device according to claim 1, wherein the thickness of the second section gradually decreases from the rear end of the second section to the front end of the second section.

13. A posture correcting device comprising:
an upper pad member having a substantially uniform thickness, a first front end, and a first rear end;
a lower pad member contacting the upper pad member, the lower pad member having a second front end and a second rear end, the second front end having a first thickness, the second rear end having a second thickness that is greater than the first thickness; and
a slit having a thickness, a length, and a width, the slit extending through the upper and lower pad members such that the thickness of the slit is equal to a combined thickness of the upper and lower pad members, the slit extending from the first rear end to a point between the first rear end and the first front end so that the length of the slit is from the first rear end to the point, a width at the first rear end being less than a width at the point, and the width of the slit gradually increases from the first rear end to the point.

14. The device according to claim 13, wherein the slit extends toward the front end from the rear end by 1–10 cm.

15. The device according to claim 13, wherein the slit has a width of 0–7 mm at the rear end, and a width of 1–20 mm at the point.

16. The device according to claim 13, wherein the bottom surface of the upper pad member is substantially non-planar.

17. A posture correcting device comprising:
an upper pad member having a substantially uniform thickness, a front end, a rear end, a top surface, and a bottom surface, the top surface and the bottom surface being planar from the front end to the rear end; and
a lower pad member having a plurality of sections, the plurality of sections including:
a first section having a substantially uniform thickness, a front end, a rear end, a top surface, and a bottom surface, the top surface of the first section contacting the bottom surface of the upper pad member so that the rear end of the first section lies adjacent to the rear end of the upoer pad member; and
a second section having a non-uniform thickness, a front end, a rear end, a top surface, and a bottom surface, the top surface of the second section contacting the bottom surface of the upper pad member so that the rear end of the second section contacts the front end of the first section, wherein the bottom surface of the second section is angled with respect to the bottom surface of the first section so that a thickness of the rear end of the second section is greater than a thickness of the front end of the second section,
wherein the second section has a width measured from the front end of the second section to the rear end of the second section, and a length measured normal to the width from a first side to a second side, a thickness of the second section being greater at a middle region along the length and smaller at a peripheral region along the length.

18. The device of claim 17 wherein a surface of the upper pad member has a concave opening, the concave opening having the shape of a hip.

19. The device according to claim 13, wherein the width of the slit continuously increases from the first rear end to the point.

20. A posture correcting device comprising:
an upper pad member having a substantially uniform thickness, a front end, a rear end, a top surface, and a bottom surface, the top surface and the bottom surface being planar from the front end to the rear end; and
a lower pad member having a plurality of sections, the plurality of sections including:
a first section having a substantially uniform thickness, a front end, a rear end, a top surface, and a bottom surface, the top surface of the first section contacting the bottom surface of the upper pad member so that the rear end of the first section lies adjacent to the rear end of the upper pad member; and
a second section having a non-uniform thickness, a front end, a rear end, a top surface, and a bottom surface, the top surface of the second section contacting the bottom surface of the upper pad member so that the rear end of the second section contacts the front end of the first section, wherein the bottom surface of the second section is angled with respect to the bottom surface of the first section so that a thickness of the rear end of the second section is greater than a thickness of the front end of the second section,
an opening formed through a central region of the upper and lower pad members, the opening having a first width; and
a slit formed through a peripheral region of the upper and lower pad members, the slit contacting the opening and the rear end of the upper pad member, the slit having a second width that is less than the first width.

* * * * *